United States Patent [19]
Hall et al.

[11] 3,877,388
[45] Apr. 15, 1975

[54] RESILIENT RAILWAY MOTOR MOUNTING

[75] Inventors: Walter O. Hall, Pittsburgh; Charles A. Yuhas, Irwin, both of Pa.

[73] Assignee: Westinghouse Electric Corporation, Pittsburgh, Pa.

[22] Filed: Sept. 11, 1973

[21] Appl. No.: 396,268

[52] U.S. Cl. ................. 105/139; 105/135; 105/136
[51] Int. Cl. ....... B61c 3/00; B61c 9/50; B61c 17/00
[58] Field of Search ........ 105/131, 132, 132.1, 136, 105/139, 135

[56] References Cited
UNITED STATES PATENTS

| | | | |
|---|---|---|---|
| 2,248,869 | 7/1941 | Harwick | 105/139 |
| 2,508,139 | 5/1950 | Binney | 105/139 X |
| 3,135,224 | 6/1964 | McLean | 105/136 |
| 3,376,831 | 4/1968 | Eaton et al. | 105/193 X |

*Primary Examiner*—Lloyd L. King
*Assistant Examiner*—Howard Beltran
*Attorney, Agent, or Firm*—R. G. Brodahl

[57] ABSTRACT

A resilient mounting for a traction drive suspension system on a railway vehicle truck. The resilient mounting permits multi-directional displacement of truck members without build up of excessive loads. The traction drive includes a motor gearbox assembly, with the gearbox coupled to an axle of the vehicle in the usual manner. A shaped pin, preferably in the shape of a diamond in cross-section, extends from and forms an integral part of the motor. A pair of mounting brackets are attached to flanges on the frame of the truck for receiving the shaped pin in a diamond shaped aperture therein which has elastomeric pads seated in the periphery thereof for providing the resilient mounting. Alternatively, the shaped pin may extend from and form an integral part of the truck frame, and the flanges and mounting brackets may extend from and form an integral part of the motor gearbox assembly.

7 Claims, 6 Drawing Figures

PATENTED APR 15 1975 3,877,388

RESILIENT RAILWAY MOTOR MOUNTING

STATEMENT

The invention herein described was made in the course of or under a contract or subcontract thereunder, (or grant) with the Department of Transportation.

CROSS REFERENCE TO RELATED APPLICATIONS

None

BACKGROUND OF THE INVENTION

In the prior art, a gearbox portion on one end of a motor gearbox assembly is coupled to the axle of a vehicle truck in the conventional manner, and the end of the assembly is secured to the frame of the vehicle truck by a vertical support member and a lateral stabilizer element. In such an arrangement, optimum spring rates in the horizontal and vertical generally are not achievable.

According to the present invention, the vertical support member and the lateral stabilizer element are replaced by a single element, namely a shaped pin extending from and forming an integral part of the motor gearbox assembly. The shaped pin is resiliently housed in support brackets mounted on flanges extending from the truck frame, providing optimum spring rates in the horizontal, vertical and rotational axes.

SUMMARY OF THE INVENTION

A railway vehicle truck has a frame mounted on a plurality of axles with wheels attached to the axles. A motor gearbox assembly has the gearbox portion of the assembly coupled to one of the axles. An N sided, where N is an integer, or a polygonally shaped pin extends from and forms an integral part of one of the motor gearbox assembly and the frame. A pair of flanges extend from and form an integral part of the remaining one of the motor gearbox assembly and the frame. Included, are mounting means having wings on the end thereof fastened respectively to the pair of flanges. The mounting means has a shape, in cross-section, intermediate the wings which extends upwardly and downwardly with respect to the wings and which has an aperture in the intermediate section with elastomeric pads seated in the periphery of the aperture, with the aperture having a shaped complementary to the shape of the shaped pin such that the shaped pin may be housed in the aperture for resiliently supporting the motor gearbox assembly. The pads have selected shear and compression spring constants such that they cooperate with the angles and dimensions of the pin to simultaneously provide desired spring rates in the horizontal, vertical and rotational axis.

DESCRIPTION OF THE PREFERRED EMBODIMENT

Figure 1:
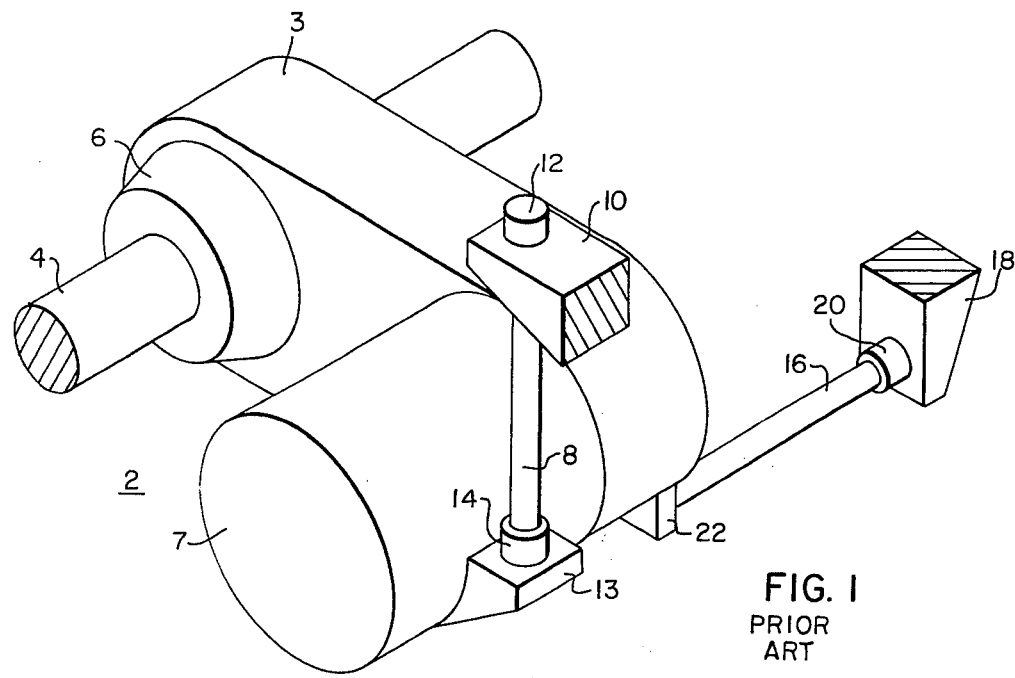
FIG. 1 illustrates a traction drive suspension system according to the prior art.

FIG. 1 illustrates a traction drive suspension system known in the prior art. A motor gearbox assembly 2 has the gearbox portion 3 of the assembly resiliently coupled to an axle 4 of a railway vehicle (not shown) by way of a resilient coupling 6. The motor portion 7 of the assembly is supported in a verticle direction by a support member such as the rod 8 which is coupled to a truck frame bracket 10 by a rubber bushing 12. The support member 8 is connected to a flange 13 on the motor by means of a rubber bushing 14. The motor is supported in the horizontal by a lateral stabilizer element such as a rod 16 which is connected to a truck frame bracket 18 by a rubber bushing 20, and to a flange 22 on the motor by a bushing (not shown). As was previously mentioned, the spring constants of the rubber bushings in traction drive suspension systems of the prior art may be compromised as to spring weight rates required such that acceptable modes of operation in the horizontal and vertical directions may not be achieved.

Figure 2:
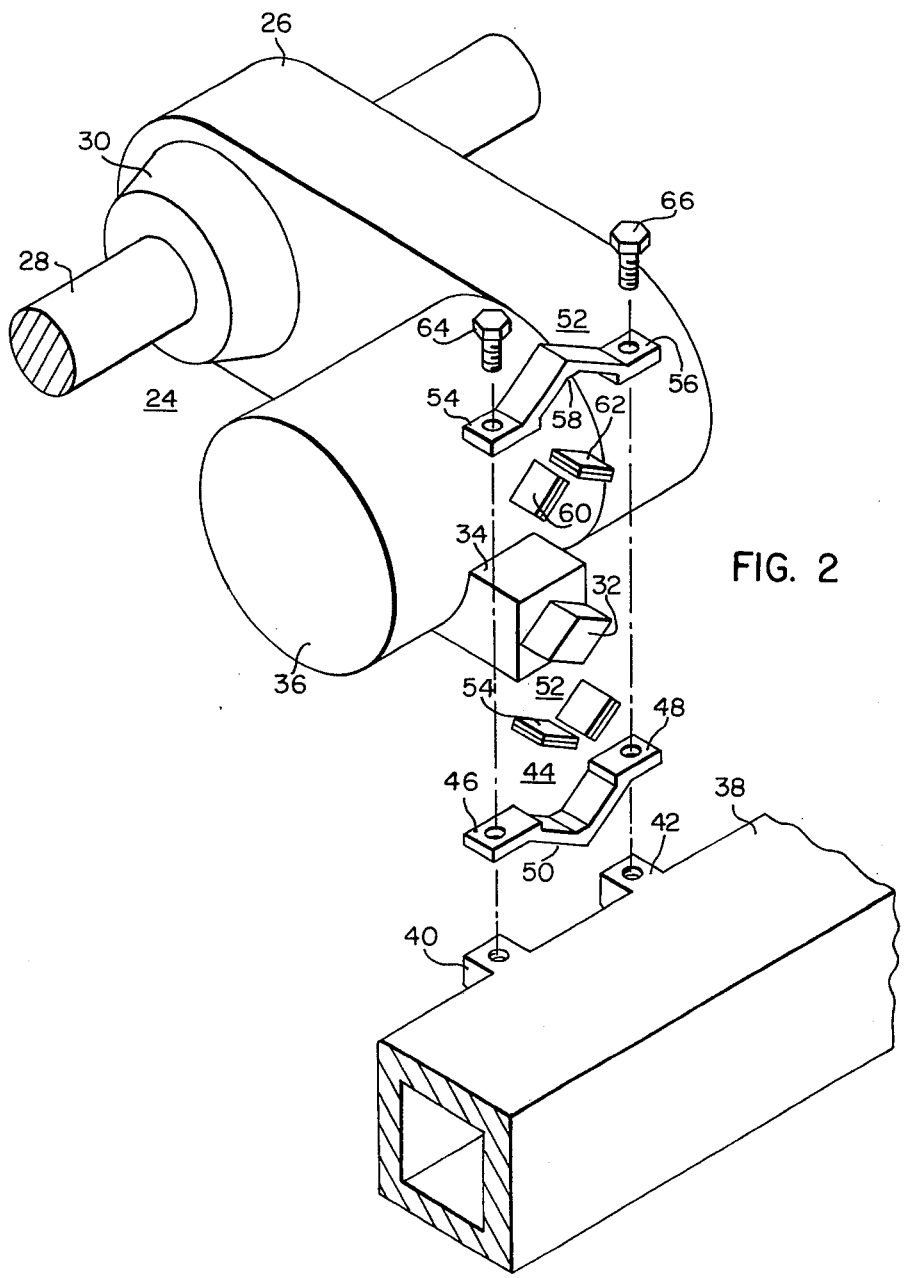
FIG. 2 illustrates an isometric view of a traction drive suspension system according to the present invention.

A traction drive suspension system according to the present invention is illustrated in FIG. 2. A motor gearbox assembly 24 has the gearbox portion 26 of the assembly resiliently coupled to an axle 28 by way of a resilient coupling 30. A polygonally shaped pin 32, which preferably has a diamond shape in cross-section, extends from a flange 34 attached to the motor portion 36 of the assembly and forms an integral part thereof. The truck frame 38 has a pair of flanges 40 and 42 extending therefrom which form an integral part thereof. A mounting means for the shaped pin 32 is formed in part by a lower bracket assembly 44 which has wings 46 and 48 on the ends thereof which mate with the flanges 40 and 42 respectively. A downwardly pointing V-shaped notch 50 is situated intermediate the wings and a V-shaped elastomeric pad device comprising a pair of elastomeric pads 52 and 54 are seated in the periphery of the notch. Alternatively a chevron spring may be seated in the periphery of the notch. In any event, the elastomeric pad devices are of the sandwich type wherein there is a rubber layer, a metal layer, a rubber layer and so on. The mounting means also includes an upper bracket assembly 52 which has wings 54 and 56 on the ends thereof for mating with the wings 46 and 48 respectively. An upwardly pointing V-shaped notch 58 is situated intermediate the wings, and an elastomeric pad device comprising elastomeric pads 60 and 62 are seated in the periphery of the V-shaped notch. Alternatively a chevron type spring may be seated in the periphery of the notch. Suitable fastening means such as bolts 64 and 66 fasten the upper bracket assembly 52 to the lower bracket assembly 44 and to the flanges 40 and 42. It is to be appreciated that the mounting means may be an integral part of the truck frame. That is, the diamond shaped aperture, for receiving the shaped pin, may be formed as an integral part of the truck frame.

Figure 3:
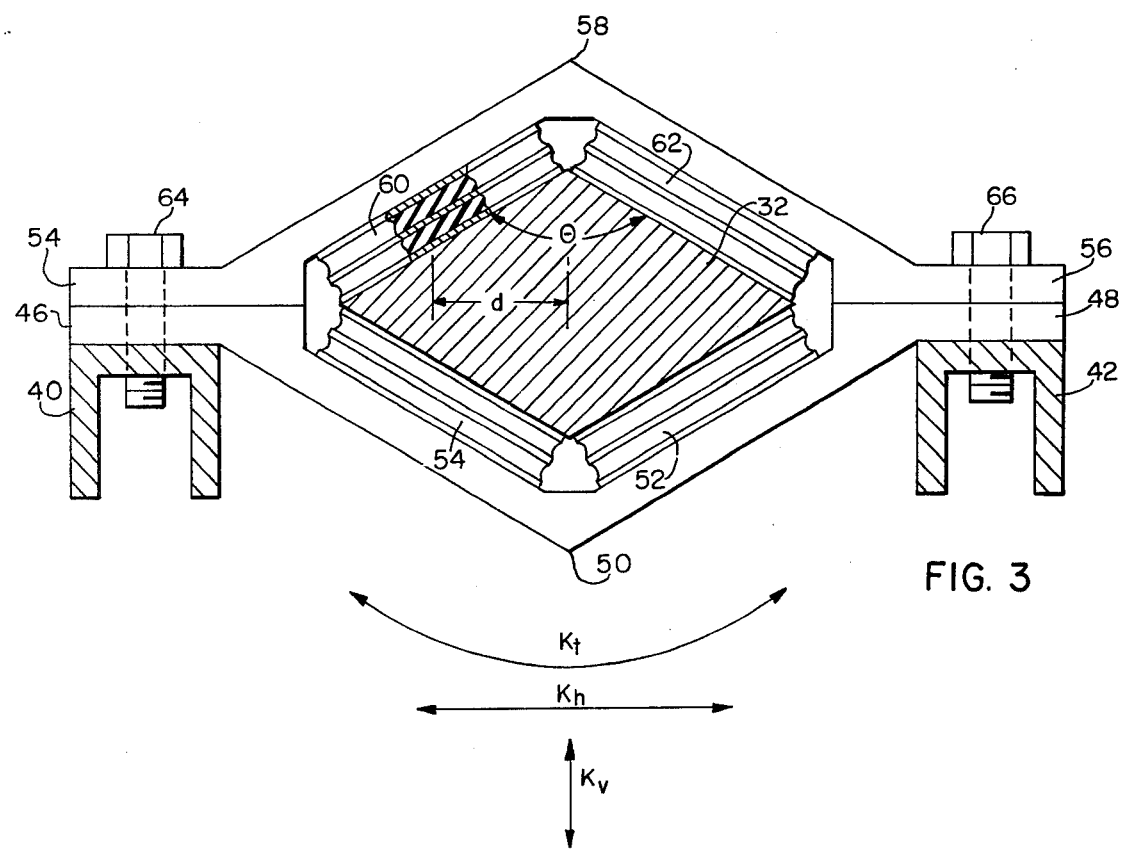
FIG. 3 is an end view of the shaped pin and mounting arrangement illustrated in FIG. 2.

FIG. 3 illustrates an end view of the diamond shaped pin 32 which is resiliently housed between the elastomeric pad devices 52, 54, 60 and 62 situated in the periphery of the aperture of the mounting means. In general, it is necessary to have different spring rates in each of five different modes of displacement for a traction drive suspension system. The five modes are listed as follows:

$Kt$: The spring rate associated with angular rotation of the motor gearbox assembly relative to the truck frame as illustrated in FIG. 3.

$Ktp$: The spring rate associated with rotation of the motor gearbox assembly relative to the truck frame in a plane perpendicular to that shown for Kt.

$Kh$: The spring rate associated with horizontal translation of the motor gearbox assembly relative to the truck frame as illustrated in FIG. 3.

$Khp$: The spring rate associated with horizontal translation of the motor gearbox assembly perpendicular to Kh.

$Kv$: The spring rate associated with vertical translation of the motor gearbox assembly relative to the truck frame as illustrated in FIG. 3.

According to the prior art, the methods of deriving the above named spring rates have required compromising the desired spring rates in one or more of the named modes. According to the present invention the desired spring rates in each of the named modes is achievable in a simple compact package, by use of the shaped pin housed in the resilient mounting which affords the desired spring rates.

For the four sides diamond shaped pin arrangement illustrated, varying spring rates in each of several different axis, as described by the modes named above, may be achieved. These spring rates are achieved by controlling the following:

$Ksc$: The shear spring constant of each of the elastomeric pads 52, 54, 60 and 62.

$Ksc'$: The compressive spring constant of the previously named elastomeric pads.

$\theta$: The included angle at the apex of the diamond shaped pin as illustrated in FIG. 3.

$d$: The dimension from the center of the diamond shaped pin 32 to the effective center of action of an individual spring, such as the elastomeric pad 60 as illustrated in FIG. 3.

The equations approximating the different modes of operation are as follows:

$Kt = 4(Ksc') (\text{SIN } \theta/2) d$
$Ktp = 4(Ksc) d$
$Kh = 4(Ksc') (\text{COS } \theta/2)$
$Khp = 4(Ksc)$
$Kv = 4(Ksc') (\text{SIN } \theta/2)$ By the proper choice of the angle $\theta$, the distance $d$, and the spring constants $Ksc$ and $Ksc'$ the desired spring rates may be achieved. For example, a relatively stiff spring rate is achievable in vertical translation and a relatively soft spring rate is achieved in the other modes of translation. Values which have found to be satisfactory for the desired modes of operation for an actual mounting are as follows:

$Ksc = 875$ lbs./in.
$Ksc' = 41,500$ lbs./in.
$\theta = 140°$
$d = 4.49$ in.

It is seen therefore, that motor gearbox assemblies having varying masses may be accommodated by the spring constants $Ksc$ and $Ksc'$ angle $\theta$ and the distance $d$ while not sacrificing the desired spring rates for the different modes of operation.

Figure 4:
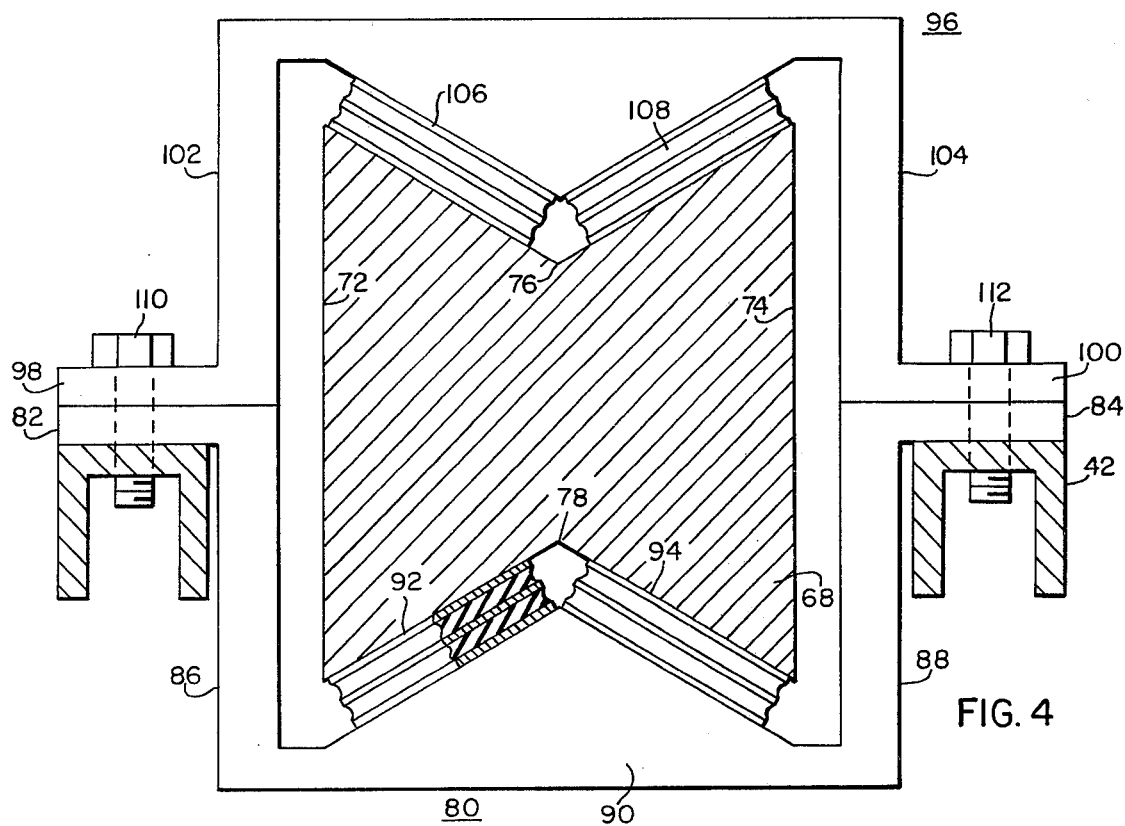
FIG. 4 is an end view of an alternative embodiment of the shaped pin and mounting apparatus.

FIG. 4 illustrates an alternative N sided or polygonally shaped pin and bracket arrangement for resiliently supporting the motor gearbox assembly. An end view of the pin and mounting combination is illustrated wherein a dovetail shaped pin 68 has two parallel vertical sides 72 and 74, and in the horizontal an upper side having a downwardly pointing V-shaped notch 76 extending from the uppermost portions of the sides 72 and 74, and a lower side having an upwardly pointing V-shaped notch 78 extending from the lowermost portions of the sides 72 and 74. A lower bracket assembly 80 has wings 82 and 84 on the ends thereof for mating with flanges 40 and 42 respectively. Extending from and intermediate the wings is a downwardly offset section defined by legs 86 and 88 with an upwardly pointing V-shaped member 90 extending between the legs 86 and 88. Elastomeric pads 92 and 94 are secured to the periphery of the V-shaped member. Alternatively the two elastomeric pads may be replaced by a chevron type spring which is secured to the periphery of the member 90. An upper bracket 96 has wings 98 and 100 on the ends thereof for mating with the wings 82 and 84 respectively of the lower bracket. There is an upwardly offset section intermediate the wings defined by the legs 102 and 104 with a downwardly pointing V-shaped member 76 extending between the legs 72 and 74. A pair of elastomeric pads 106 and 108 are seated on the periphery of the V-shaped member. It is seen that the respective V-shaped members of the upper and lower brackets are complementary in shape relative to pin 68 and form converging V's about their axis of symmetry such that the shaped pin 68 is resiliently housed between the upper and lower brackets. Suitable fastening means such as bolts 110 and 112 fasten the upper bracket 96 to the lower bracket 80 and in turn to the flanges 40 and 42 respectively. It is seen for the pin bracket arrangement illustrated in FIG. 4 that $\theta$ is greater than 180° and in such a configuration a weaker pin results for the same amount of material forming the pin as compared with the diamond shaped pin. It is to be appreciated that other shaped pins having conical shapes or the like may be used in the practice of the invention. However, a pin circular in shape is generally not desirable since the horizontal and vertical spring rates would be substantially the same in such an arrangement.

Figure 5:
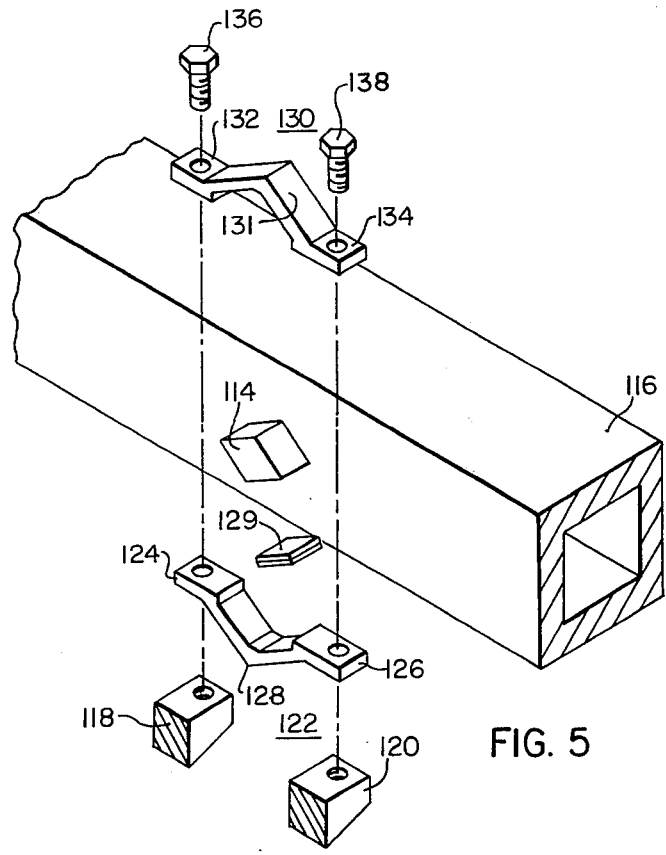
FIG. 5 is an isometric view of another suspension system according to the present invention.

An alternative embodiment for supporting the motor gearbox assembly to the frame, is one in which the shaped pin extends from and forms an integral part of the truck frame, and the respective mounting brackets are attached to flanges which extend from and form an integral part of the motor gearbox assembly. Such an arrangement is illustrated in FIG. 5 where a diamond shaped pin 114 extends from and forms an integral part of the truck frame 116. A pair of flanges 118 and 120 extend from and form an integral part of the motor gearbox assembly (not shown). A lower bracket assembly 122 includes a pair of wings 124 and 126 on the ends thereof for mating with the flanges 118 and 120 respectively. Intermediate the wings is a downwardly pointing V-shaped notch 128 which has a pair of elastomeric pad devices seated in the periphery of the notch (only one such pad 129 is illustrated). An upper bracket assembly 130 has a pair of wings 132 and 134 on the ends thereof for mating with the wings 124 and 126 respectively. Intermediate the wings is an upwardly pointing V-shaped notch 131 which has a pair of elastomeric pads (not shown) inserted in the periphery of the notch in an manner similar to that illustrated for bracket 122. The upper bracket assembly 130 is secured to a lower bracket assembly 122 and in turn the flanges 118 and 120 by suitable fastening means such as bolts 136 and 138 such that the shaped pin 114 is resiliently housed in the aperture formed by the respective mounting brackets.

Figure 6:
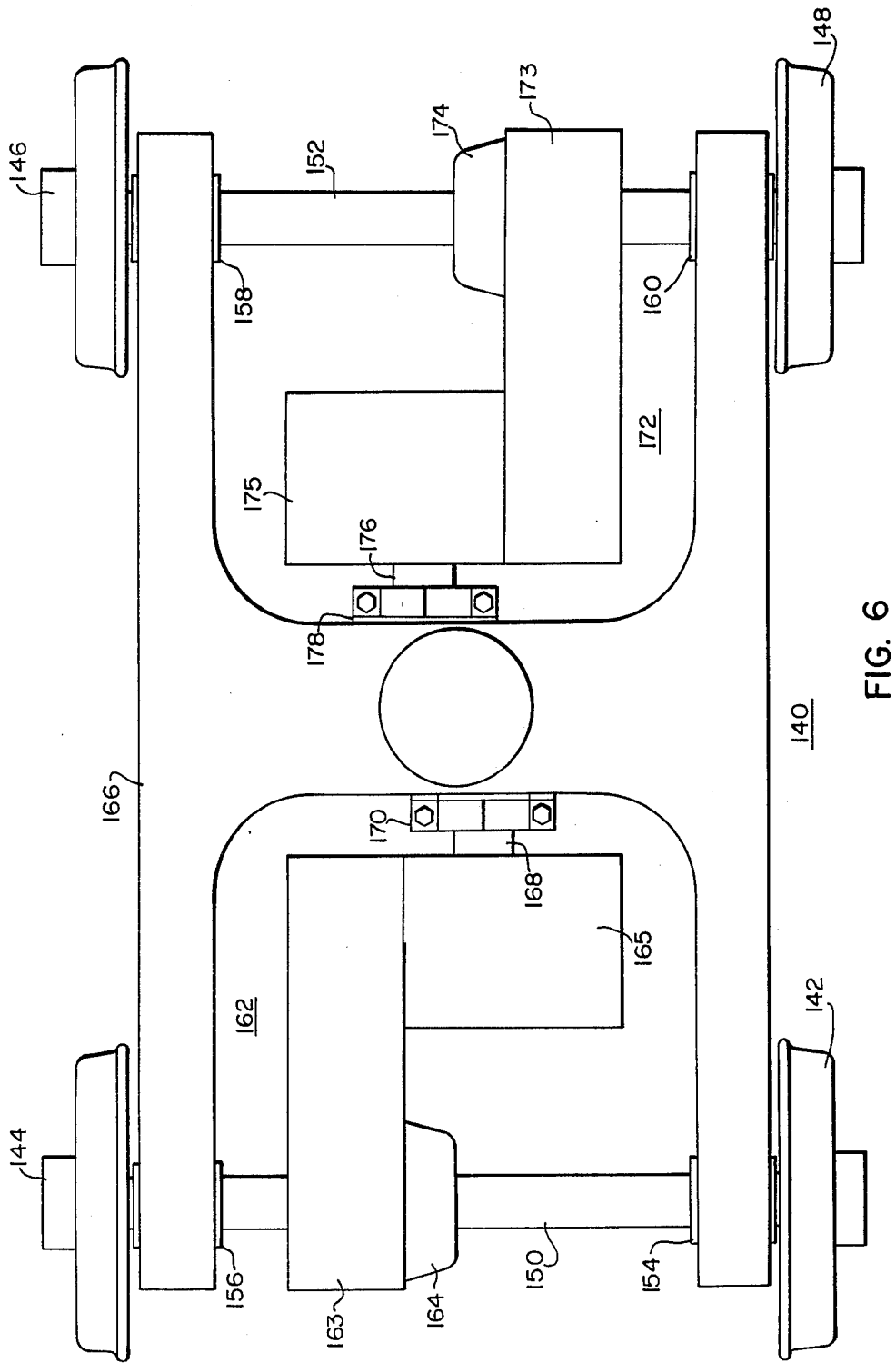
FIG. 6 is a plan view of a vehicle truck including a traction drive suspension system according to the present invention.

FIG. 6 illustrates a top view of a vehicle truck in which two motor gearbox assemblies are coupled to the respective axles and are resiliently mounted to the truck frame according to the present invention. A vehicle truck 140 has four wheels 142, 144, 146 and 148 mounted in spaced pairs on axles 150 and 152, the ends of which are rotatably received within the usual journal bearings 154, 156, 158 and 160. A motor gearbox assembly 162 has the gearbox portion 163 thereof resiliently coupled to the axle 150 by way of a resilient coupling 164 and the motor portion 165 thereof is resiliently coupled to the truck frame 166 by way of the diamond shaped pin 168 and the bracket support assembly 170. On the opposite end of the truck a motor gearbox assembly 172 has the gearbox portion 173 thereof resiliently coupled to the axle 152 by way of a resilient coupling means 174 and the motor portion 175 thereof coupled to the frame 166 by way of a diamond shaped pin 176 and a bracket support assembly 178.

In summary a motor gearbox support system has been illustrated in which the gearbox portion of the assembly is resiliently coupled to an axle of a vehicle, and the motor portion of the assembly is resiliently coupled to the truck frame by a single shaped pin.

We claim:

1. In a vehicle truck having a frame mounted on a plurality of axles with one or more wheels attached to each of said axles, the combination comprising:
    a motor gearbox assembly having a gearbox portion coupled to one of said axles;
    a polygonally shaped pin forming an integral part of one of said motor gearbox assembly and said frame and having predetermined dimensions and predetermined angles between adjacent sides of said pin; and
    mounting means forming an integral part of the other of said motor gearbox assembly and said frame, and having, in cross section, a polygonal aperture therein which is complementary in shape with respect to said pin; and
    elastomeric pad devices seated in the periphery of said aperture such that said pin may be received in and resiliently housed in said aperture, said pad devices having predetermined shear and compression spring constants such that they cooperate with said predetermined angles and dimensions of said pin to simultaneously provide desirable spring rates in the horizontal, vertical and rotational axes.

2. For a vehicle truck having a frame mounted on a plurality of axles with one or more wheels attached to each of said axles, the combination comprising:
    a motor gearbox assembly, having a gearbox portion coupled to one of said axles;
    a diamond shaped pin forming an integral part of one of said motor gearbox assembly and said frame and having predetermined dimensions and predetermined angles between adjacent sides of said pin;
    a pair of flanges which form an integral part of the other of said motor gearbox assembly and said frame; and
    mounting means fastened to said pair of flanges and having, in cross section, a diamond shaped aperture having a shape complementary to the shape of said diamond shaped pin; and
    elastomeric pad devices seated in the periphery of said diamond shaped aperture such that said pin may be housed in said aperture for resiliently supporting said motor gearbox assembly, with said pad devices having predetermined shear and compression spring constants such that they cooperate with said predetermined dimensions and angles of said pin to simultaneously provide desired spring rates in the horizontal, vertical, and rotational axes.

3. The combination claimed in claim 2, wherein said mounting means comprises:
    a lower bracket having first wings on the ends thereof for mating with said pair of flanges and having a downwardly pointing V-shaped notch intermediate said first wings;
    an upper bracket having second wings on the ends thereof for mating with said first wings of said lower bracket and having an upwardly pointing V-shaped notch intermediate said second wings, the respective notches in said upper and lower brackets being diverging V's about their axis of symmetry such that said diamond shaped pin may be housed between said upper and lower brackets; and
    means for fastening said upper and lower brackets together and to said pair of flanges for housing said diamond shaped pin between said upper and lower brackets for resiliently supporting said motor gearbox assembly.

4. The combination claimed in claim 3 wherein said diamond shaped pin forms an integral part of the motor portion of said motor gearbox assembly and wherein said flanges form an integral part of said frame.

5. For a vehicle truck having a frame mounted on a plurality of axles, with one or more wheels attached to each of said axles, the combination comprising:
    a motor gearbox assembly having a gearbox portion coupled to one of said axles;
    a dovetail shaped pin which forms an integral part of a predetermined one of said motor gearbox assembly and said frame and having predetermined dimensions and predetermined angles between adjacent sides of said pin;
    a pair of flanges which form an integral part of the other of said motor gearbox assembly and said frame;
    mounting means fastened to said pair of flanges and having in cross section, a dovetail shaped aperture complementary to the shape of said dovetail shaped pin; and
    elastomeric pad devices seated in the periphery of said dovetail shaped aperture such that said pin may be housed in said aperture for resiliently supporting said motor gearbox assembly, with said pad devices having predetermined shear and compression spring constants such that they cooperate with said predetermined dimensions and angles of said pin to simultaneously provide desired spring rates in each of the horizontal, vertical, and rotational axes.

6. The combination claimed in claim 5, wherein said mounting means comprises:
- a lower bracket having first wings on the ends thereof for mating with said pair of flanges and including a downward offset intermediate said first wings with an upwardly pointing V-shaped member in said downward offset;
- an upper bracket having second wings on the ends thereof for mating with the first wings of said lower bracket and including an upward offset intermediate said second wings with a downwardly pointing V-shaped member in said upward offset, with the respective V-shaped members of said upper and lower brackets being converging V's about their axis of symmetry such that said dovetail shaped pin may be housed between said upper and lower brackets; and
- means for fastening said upper and lower brackets together and to said pair of flanges for housing said pin between said upper and lower brackets for resiliently supporting said motor gearbox assembly.

7. The combination claimed in claim 6 wherein said dovetail shaped pin forms an integral part of the motor portion of said motor gearbox assembly, and wherein said flanges form an integral part of said frame.

* * * * *